(12) United States Patent
Chigusa et al.

(10) Patent No.: US 9,814,351 B2
(45) Date of Patent: Nov. 14, 2017

(54) BREAST MILK STERILIZING APPARATUS

(71) Applicants: MITA RIKA KOGYO CO., LTD., Osaka (JP); Nobuyuki Takemoto, Hirakata-shi (JP)

(72) Inventors: Koichi Chigusa, Osaka (JP); Nobuyuki Takemoto, Hirakata (JP)

(73) Assignees: MITA RIKA KOGYO CO., LTD., Osaka (JP); Nobuyuki Takemoto, Hirakata-shi (JP)

( * ) Notice: Subject to any disclaimer, the term of this patent is extended or adjusted under 35 U.S.C. 154(b) by 460 days.

(21) Appl. No.: 14/505,760

(22) Filed: Oct. 3, 2014

(65) Prior Publication Data

US 2015/0245737 A1    Sep. 3, 2015

(30) Foreign Application Priority Data

Mar. 3, 2014   (JP) ................................. 2014-040152

(51) Int. Cl.
| | |
|---|---|
| *A47J 36/24* | (2006.01) |
| *H05B 1/02* | (2006.01) |
| *H05B 3/42* | (2006.01) |
| *A23L 3/005* | (2006.01) |
| *A23L 3/10* | (2006.01) |

(52) U.S. Cl.
CPC ........... *A47J 36/2433* (2013.01); *A23L 3/005* (2013.01); *A23L 3/10* (2013.01); *H05B 1/0269* (2013.01); *H05B 1/0297* (2013.01); *H05B 3/42* (2013.01); *H05B 2203/021* (2013.01)

(58) Field of Classification Search
None
See application file for complete search history.

(56) References Cited

U.S. PATENT DOCUMENTS

| | | | | |
|---|---|---|---|---|
| 1,762,171 | A * | 6/1930 | Goldsmith | A47J 36/2438 219/436 |
| 1,994,206 | A * | 3/1935 | Zeve | A47J 36/2433 219/415 |
| 2,500,241 | A * | 3/1950 | Brown | A47J 36/2433 219/438 |
| 2,516,637 | A * | 7/1950 | McCollum | A47J 36/2433 219/433 |
| 3,864,976 | A * | 2/1975 | Parker | A61J 9/02 116/216 |
| 3,969,610 | A * | 7/1976 | Ratti | A47J 27/62 219/435 |

(Continued)

FOREIGN PATENT DOCUMENTS

| | | | | |
|---|---|---|---|---|
| IE | WO 2010006721 A2 * | 1/2010 | | A47J 36/2433 |
| JP | S48-32068 | 10/1973 | | |

*Primary Examiner* — Joseph M Pelham
(74) *Attorney, Agent, or Firm* — Kratz, Quintos & Hanson, LLP

(57) ABSTRACT

A breast milk sterilizing apparatus provided with a nursing bottle holding breast milk, a holder cylinder body of metal having a cylindrical wall portion to which the nursing bottle is inserted, a heater and a heater temperature sensor wound around a periphery of the cylindrical wall portion, a breast milk temperature sensor to measure breast milk temperature on a bottom face of the nursing bottle, and a breast milk temperature controlling portion to control the heater based on a breast milk temperature measured value measured by the breast milk temperature sensor.

2 Claims, 8 Drawing Sheets

(56) References Cited

U.S. PATENT DOCUMENTS

| | | | | |
|---|---|---|---|---|
| 4,399,351 | A * | 8/1983 | Koff | A47J 27/004 219/430 |
| 4,975,246 | A * | 12/1990 | Charm | A23B 5/01 422/21 |
| 6,417,498 | B1 * | 7/2002 | Shields | A47J 36/2427 219/386 |
| 6,953,914 | B2 * | 10/2005 | Suzuki | A47J 36/2433 165/64 |
| 7,727,494 | B2 * | 6/2010 | Kim | A61L 2/07 122/13.01 |
| 7,854,387 | B2 * | 12/2010 | Kammer | A61M 5/445 219/430 |
| 8,309,891 | B2 * | 11/2012 | Kammer | A61M 3/0245 219/432 |
| 8,789,534 | B2 * | 7/2014 | Faries, Jr. | A61B 46/10 128/849 |
| 2002/0031462 | A1 * | 3/2002 | Jorgensen | A23C 3/023 422/307 |
| 2005/0072771 | A1 * | 4/2005 | Suzuki | A47J 36/2433 219/441 |
| 2011/0062149 | A1 * | 3/2011 | Driel | A47J 36/2433 219/618 |
| 2011/0192830 | A1 * | 8/2011 | Wilson | F24C 7/10 219/386 |
| 2014/0190357 | A1 * | 7/2014 | Mak | A47J 36/2438 99/453 |

* cited by examiner

BREAST MILK STERILIZING APPARATUS

FIELD OF THE INVENTION

This invention relates to a breast milk sterilizing apparatus.

DESCRIPTION OF THE RELATED ART

Conventionally, a nursing bottle is sterilized by boiling and a steam sterilizing apparatus (refer to Japanese Utility Model Publication NO. S48-32068, for example). When the breast milk may be infested with germs and viruses, the nursing bottle holding the breast milk is dipped into hot water, and a thermometer is dipped into the breast milk to conduct hot water bathing until the breast milk reaches for a predetermined sterilization temperature.

However, temperature administration is difficult in hot water bathing. That is to say, when the temperature of the breast milk is too high, deterioration of proteins (denaturation of immunoglobulin) and loss of vitamin are caused, and when the hot water bathing is ended with low temperature of the breast milk, cytomegalovirus (CMV), HIV virus, and germs are not completely sterilized. And, the hot water bathing needs time and labor, and the thermometer needs sterilization and washing separately from the nursing bottle because direct dipping of the thermometer into the breast milk is inhygienic.

Therefore, it is an object of the present invention to provide a breast milk sterilizing apparatus which is hygienic and can easily and certainly sterilize breast milk.

BRIEF DESCRIPTION OF THE DRAWINGS

The present invention will be described with reference to the accompanying drawings, in which.

DESCRIPTION OF THE PREFERRED EMBODIMENTS

Figure 1:
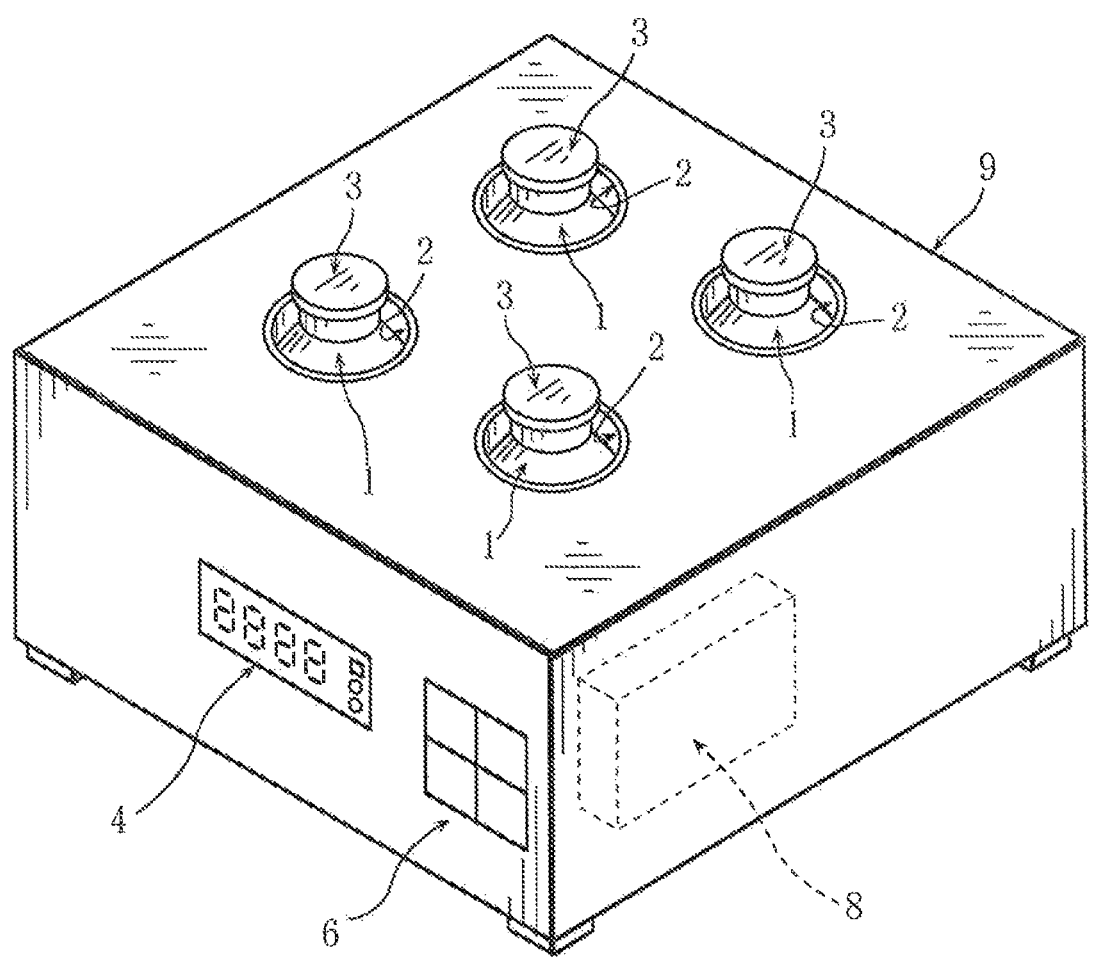
FIG. 1 is a whole perspective view showing an embodiment of the present invention.

Preferred embodiments of the present invention will now be described with reference to the accompanying drawings.

A breast milk sterilizing apparatus of the present invention is provided with plural nursing bottles 1 of resin for holding breast milk, a lid body 3 to lid the nursing bottle 1, a holder cylinder body 2 of metal having a cylindrical wall portion 21 to which the nursing bottle 1 is inserted, and a case body (casing) 9 to hold the plural holder cylinder bodies 2.

And, an indicating means 4 such as an LED indication panel and a liquid crystal monitor to indicate breast milk temperature and set value, and an operation means 6 such as switches and a touch panel to switch on and off various set values and power source and operate start and stop of heating, are attached to an outer face of the case body 9.

Figure 2:
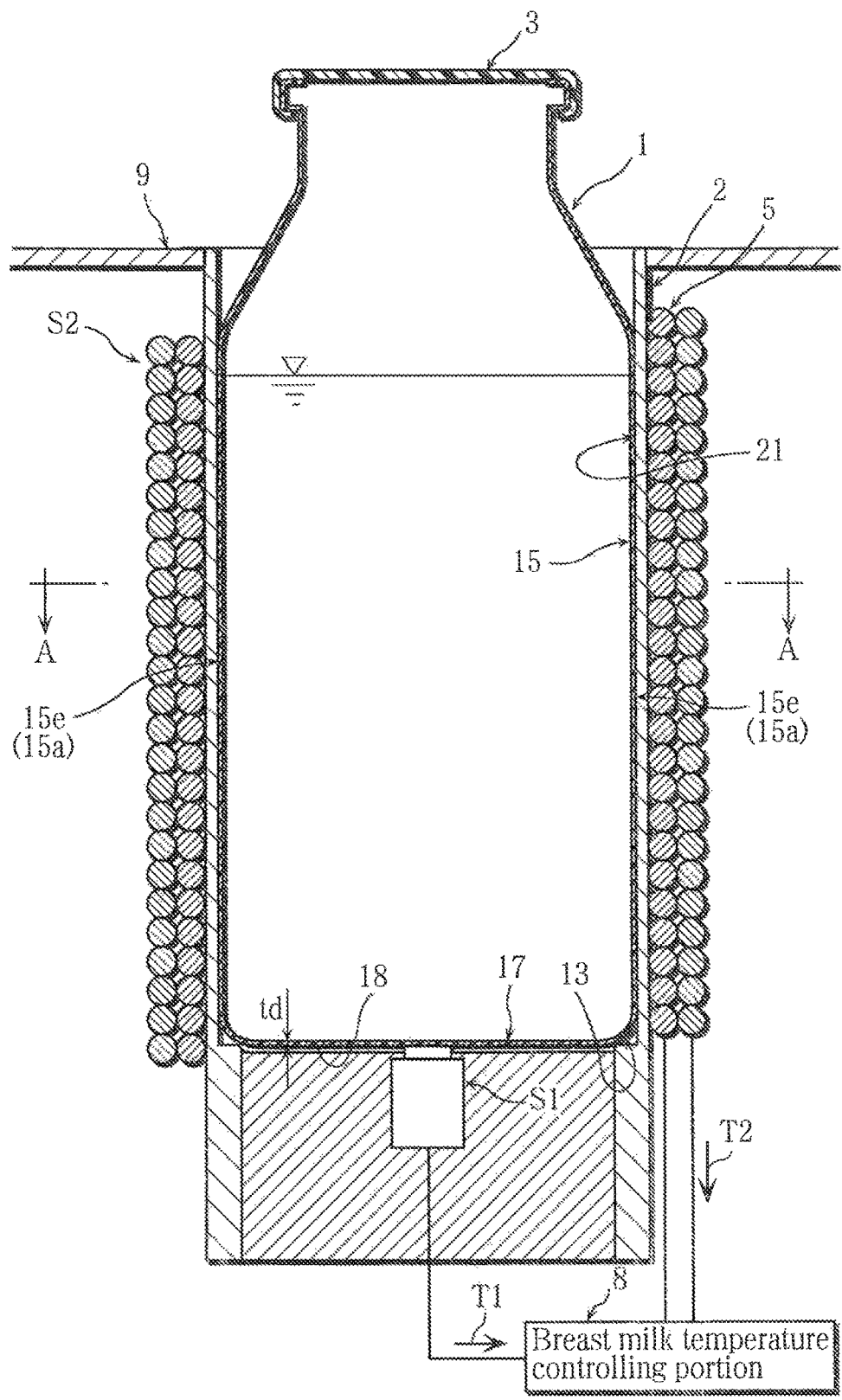
FIG. 2 is a cross-sectional side view of a principal portion.

As shown in FIG. 2, a heater 5 and a heater temperature sensor S2 wound around a periphery of the holder cylinder body 2 to which the nursing bottle 1 is inserted, and a breast milk temperature sensor S1 to measure the temperature of the breast milk in the nursing bottle 1 on a bottom face 18 side of the nursing bottle 1, are provided within the case body 9, and heat of the heater 5 is transferred to the breast milk through the holder cylinder body 2 and the nursing bottle 1 to heat the breast milk. Further, a breast milk temperature controlling portion 8 for feedback control of the heater 5 based on breast milk temperature measured value (breast milk temperature measuring signal) T1 measured by the breast milk temperature sensor S1 is provided.

The breast milk temperature sensor S1 is, for example, a platinum temperature sensor which contacts the bottom face 18 of the nursing bottle 1 to measure the temperature of the breast milk in the nursing bottle 1.

A thickness dimension td on a bottom wall portion 17 of the nursing bottle 1, of which thickness is 0.1 mm to 0.8 mm, is formed by blow molding. Therefore, measuring accuracy (result) of the breast milk temperature sensor S1, similar to that of a case in which a waterproof temperature sensor is put into the nursing bottle 1 to measure the temperature of the breast milk, can be obtained.

Figure 3:
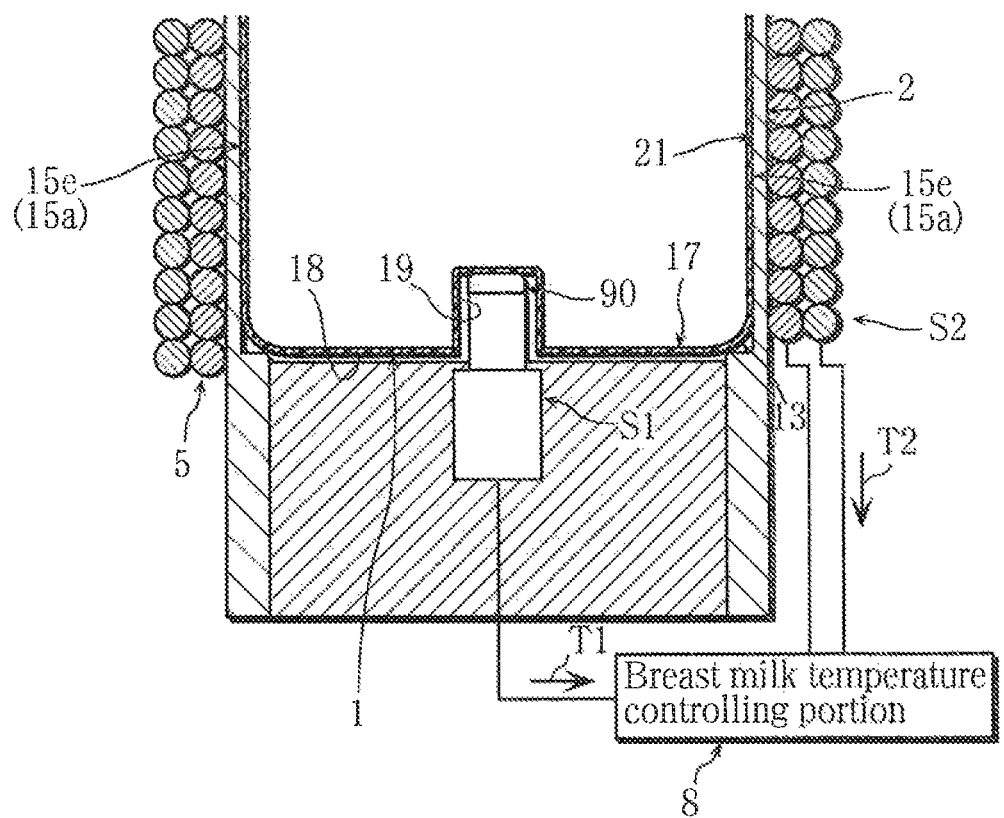
FIG. 3 is an enlarged cross-sectional view of a principal portion showing another example of the nursing bottle and the breast milk temperature sensor.
Figure 4:
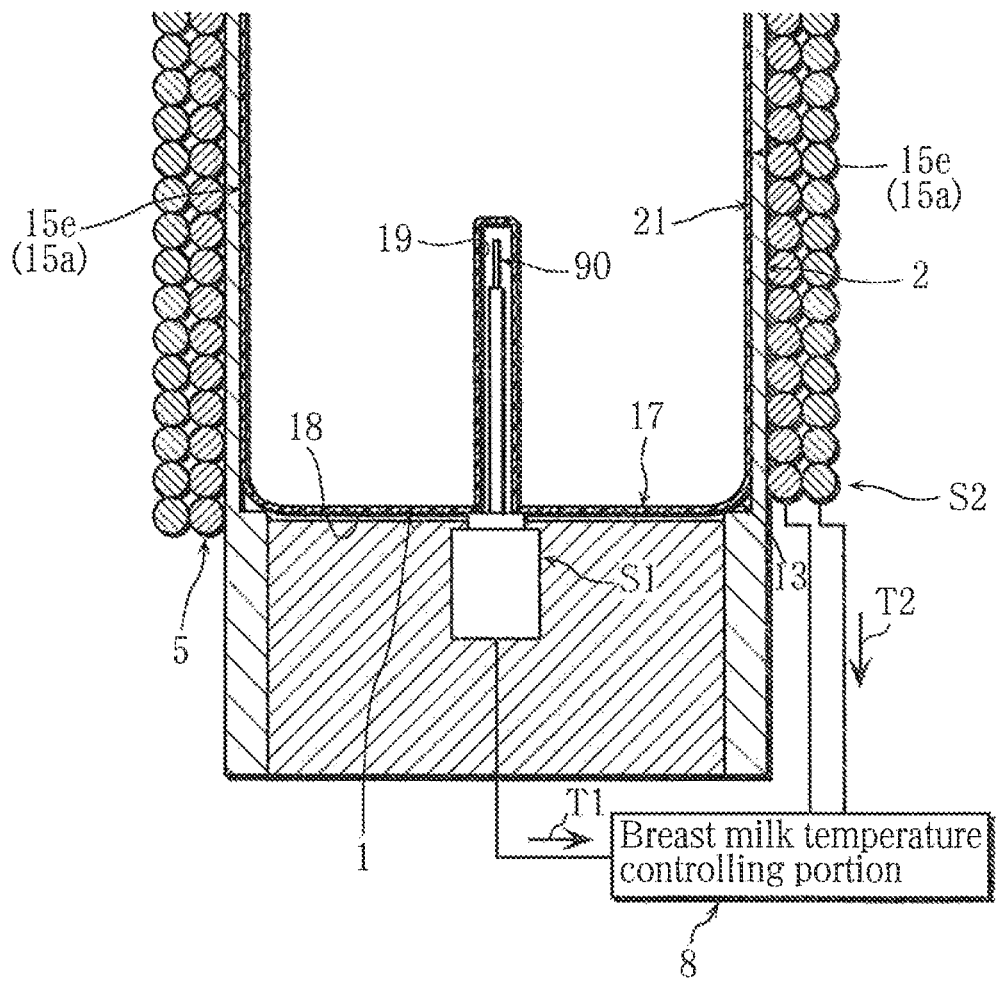
FIG. 4 is an enlarged cross-sectional view of a principal portion showing another example of the nursing bottle and the breast milk temperature sensor.

And, as shown in FIG. 3 and FIG. 4, the nursing bottle 1 may have a concave portion 19 to which a detecting portion (forth end portion) 90 of the breast milk temperature sensor S1 is inserted from the bottom face 18 side. The concave portion 19 is preferably formed as a circular hole on the center (central portion) of the bottom face 18. The temperature of the breast milk near the central portion can be measured by the concave portion 19 for control of further high accuracy and efficiency.

And, the breast milk temperature sensor S1, not restricted to the platinum temperature sensor, may be a detecting portion 90 of thin wire type such as a thermoelectric couple as shown in FIG. 4.

Figure 5:
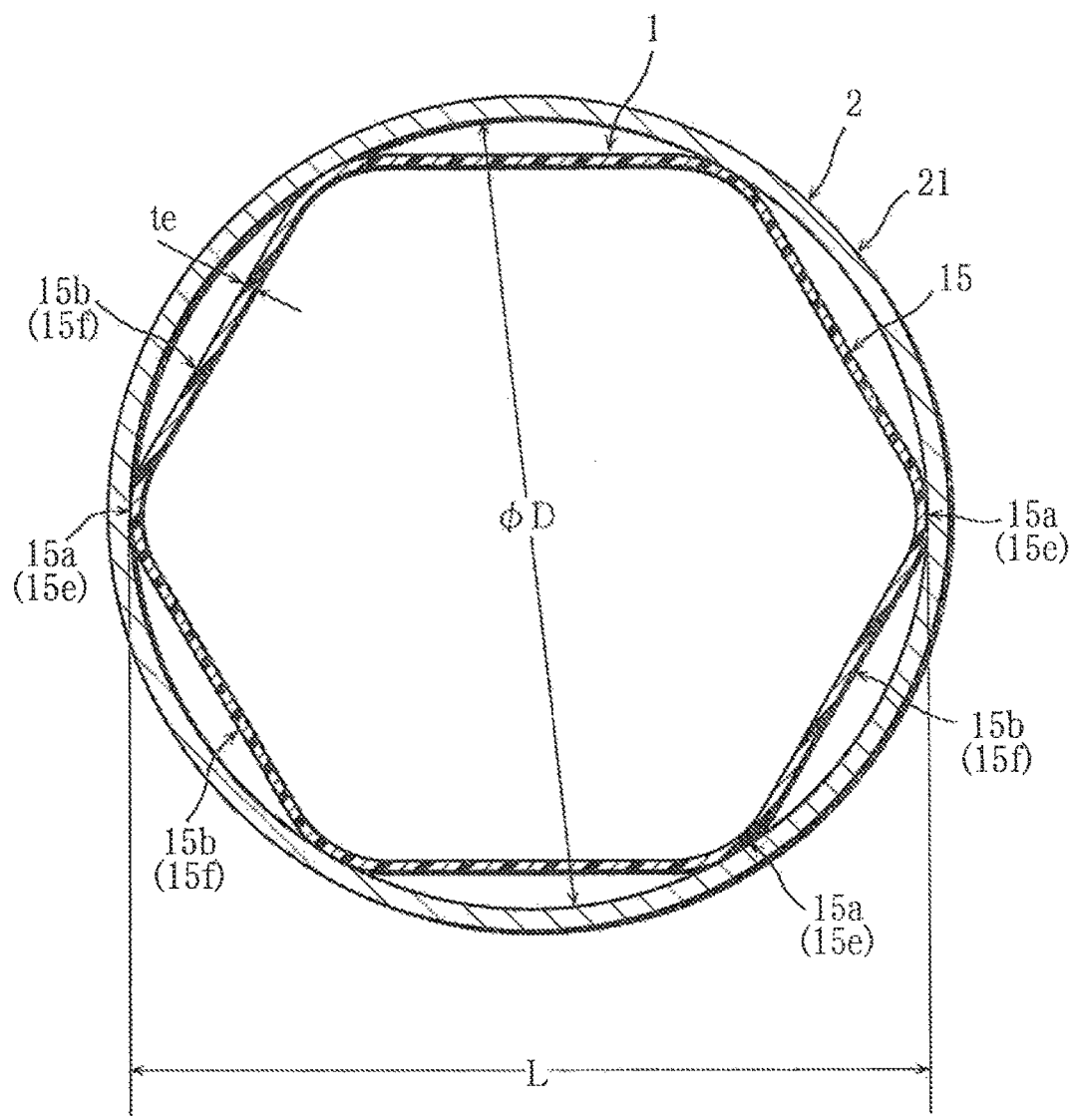
FIG. 5 is a cross-sectional view of the principal portion of FIG. 2 along A-A line.

Further, the nursing bottle 1 has an outer wall portion 15 of polygonal cross section inserted to the cylindrical wall portion 21 as shown in FIG. 5. Concretely, the outer wall portion 15 is formed into a hexagonal configuration in cross section having 6 corner portions 15a and 6 side portions 15b. Each corner portion 15a is formed R-shaped (arc-shaped in cross section).

In other words, the nursing bottle 1 has the outer wall portion 15 of polygonal cylinder inserted to the cylindrical wall portion 21. The outer wall portion 15 of polygonal cylinder is a hexagon having 6 flat wall portions 15f, and 6 ridge line portions 15e (arc-shaped in cross section) to connect the neighboring flat wall portions 15f.

In FIG. 5, the heater 5 and the heater temperature sensor S2 are omitted.

A diagonal distance (diagonal dimension) L of the nursing bottle 1 is formed larger than an inner diameter dimension D of the cylindrical wall portion 21 in a free state (a standard state in which the nursing bottle 1 is not filled with breast milk and not inserted to the cylindrical wall portion 21).

That is to say, the nursing bottle 1 is press fit into the cylindrical wall portion 21, the side portion 15b (the flat wall portion 15f) of the outer wall portion 15 polygonal in cross section is bent in radial direction (radial inner or outer direction) with standard of an axis of the cylindrical wall portion 21, the diagonal distance (diagonal dimension) L corresponds to the inner diameter dimension D, and the corner portion 15*a* (the ridge line portion 15*e*) is press-fit to the inner peripheral face of the cylindrical wall portion 21 by elastic resilient force of the outer wall portion 15.

That is to say, even if the inner diameter dimension D of the cylindrical wall portion 21 becomes larger than that in normal temperature by heat inflation, the corner portion 15*a* (the ridge line portion 15*e*) of the nursing bottle 1 is always touching (press-fit to) the inner peripheral face of the cylindrical wall portion 21.

In other words, the diagonal distance L of the nursing bottle 1 in free state is formed larger than the inner diameter dimension D of the cylindrical wall portion 21 when heat inflated (in heat inflation) by heating of the heater 5.

And, a thickness dimension te of the outer wall portion 15 (the corner portion 15*a* and the side portion 15*b*) is set to be 0.1 mm to 0.8 mm to make the wall portion 15 elastically deformable, having sufficient strength to hold the breast milk, and, the heat from the heater 5 through the holder cylinder body 2 can be transferred to the breast milk with good efficiency.

And, the nursing bottle 1 and the lid body 3 are made of PP (polypropylene), and the holder cylinder body 2 is made of aluminum, a metal having good heat conduction.

And, a bottom edge portion 13, on which the bottom face 18 (the bottom wall portion 17) contacts the outer wall portion 15, is R-shaped as a guiding portion when press-fit to the cylindrical wall portion 21 (for elastic deformation of the outer wall portion 15 diminishing in diameter).

Although the outer wall portion 15 of the nursing bottle 1 can be formed into a cylinder (a circular configuration in cross section), the outer diameter dimension of the outer wall portion 15 of the nursing bottle 1 and the inner diameter dimension D of the cylindrical wall portion 21 of the holder cylinder body 2 have to be formed with high accuracy because the outer wall portion 15 has to contact the cylindrical wall portion 21 in the heat inflation of the holder cylinder body 2, and has to be press-fit to the holder cylinder body 2 in the standard state before the heat inflation without difficulty.

Figure 6:
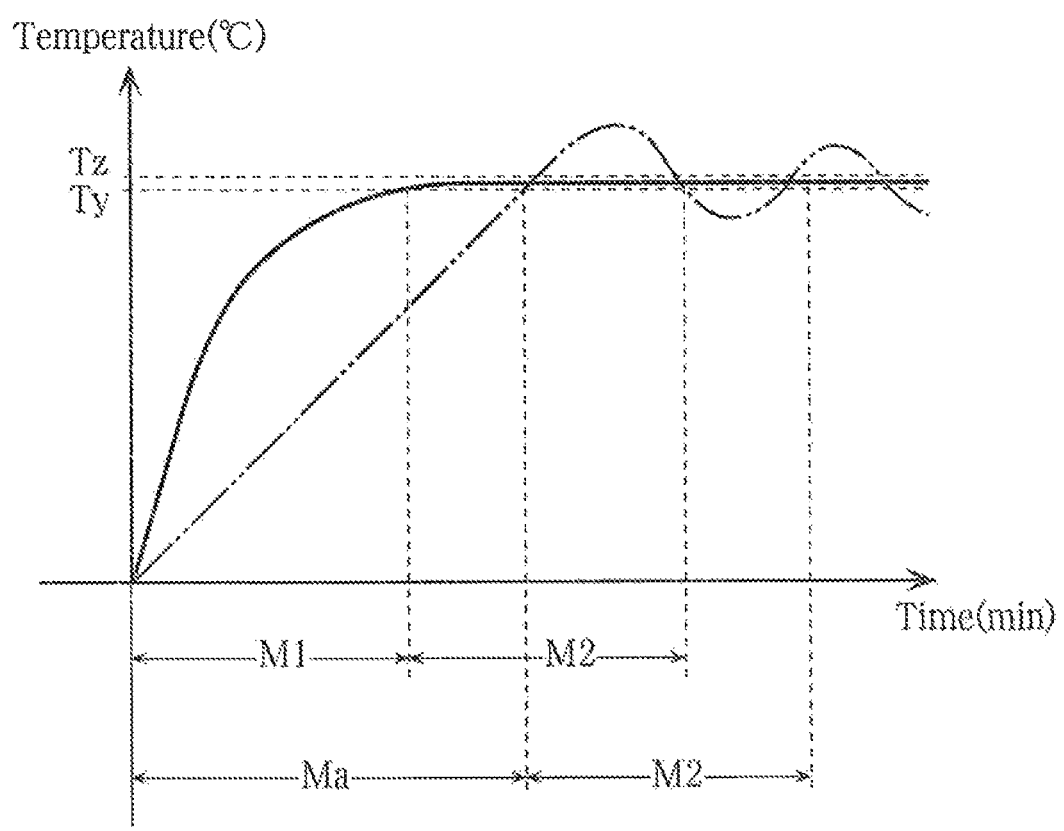
FIG. 6 is a graph showing temperature change of breast milk of the embodiment and a comparative example.

Next, the breast milk temperature controlling portion 8 controls the heater 5 as the temperature of the breast milk increases as shown with a solid line in a graph of FIG. 6. That is to say, the heater 5 is controlled as that increasing speed of the temperature of the breast milk is reduced as the temperature of the breast milk comes close to an upper limit value Tz of sterilization temperature, and the temperature of the breast milk does not exceed the upper limit value Tz of sterilization temperature. And, the heater 5 is controlled as that from a starting point (of sterilization), a point of time when the temperature of the breast milk goes over a predetermined lower limit value Ty of sterilization temperature, the breast milk is kept within a range from the lower limit value Ty to the predetermined upper limit value Tz for a predetermined sterilization processing time M2 (or more than the predetermined sterilization processing time M2).

Further, the breast milk temperature controlling portion 8 controls the heater 5 (administrates the increasing speed of the temperature of the breast milk) as that a preliminary heating time M1, from the beginning of the heating to the lower limit value Ty of sterilization temperature (the time before keeping the temperature of the breast milk for the sterilization processing time M2), is equal to or more than half of the sterilization processing time M2 and equal to or less than the sterilization processing time M2. In other words, when the sterilization processing time is M2 and the preliminary heating time is M1, the heater 5 is controlled as to fulfill a formula $$(M2/2) \leq M1 \leq M2.$$

Concretely, the lower limit value Ty of sterilization temperature is set to be 62.5° C., the upper limit value Tz of sterilization temperature is set to be 63.0° C., the sterilization processing time M2 is set to be 30 minutes, and the preliminary heating time M1 is set to be 15 to 30 minutes.

When the lower limit value Ty of sterilization temperature is less than 62.5° C., cytomegalovirus (CMV), HIV virus, and germs may not be sterilized. And, when the upper limit value Tz of sterilization temperature is more than 63.0° C., bad influence such as deterioration of proteins (denaturation of immunoglobulin) and loss of vitamin may be caused on nutrition and effective components. And, when the sterilization processing time M2 is less than 30 minutes, sterilization may be insufficient.

The breast milk temperature controlling portion 8 reads a breast milk temperature measured value T1 measured by the breast milk temperature sensor S1 and a heater temperature measured value T2 measured by the heater temperature sensor S2, calculates the difference between the breast milk temperature measured value T1 and a breast milk temperature set value Ta as a standard by a subtractor 81 to keep the standard temperature, and, the difference is made appropriate size by a variable gain amp 82 and added to a heater temperature set value Tb by an adder 83.

And, a value Tα calculated by the adder 83 and the heater temperature measured value T2 measured by the heater temperature sensor S2 are sent to a PI controller 80 to conduct PI control (proportional plus integral control) of the heater 5 (a heater temperature controller 86).

And, the breast milk temperature measured value T1 is compared with a heating temperature limit value Td by a limit comparator 84, the result of comparison is judged by a limit judge 85, the heater temperature controller 86 is controlled based on the judged result signal (ON-OFF signal) as to control the heater 5 not to exceed the heating temperature limit value Td.

And, the breast milk is easily heated when there is a difference between the heater temperature and the breast milk temperature. Therefore, the difference is judged and the heater temperature is appropriately controlled because the breast milk rapidly come close to the set temperature for the difference before closing to the heating limit in an early stage (beginning of the preliminary heating).

Figure 7:
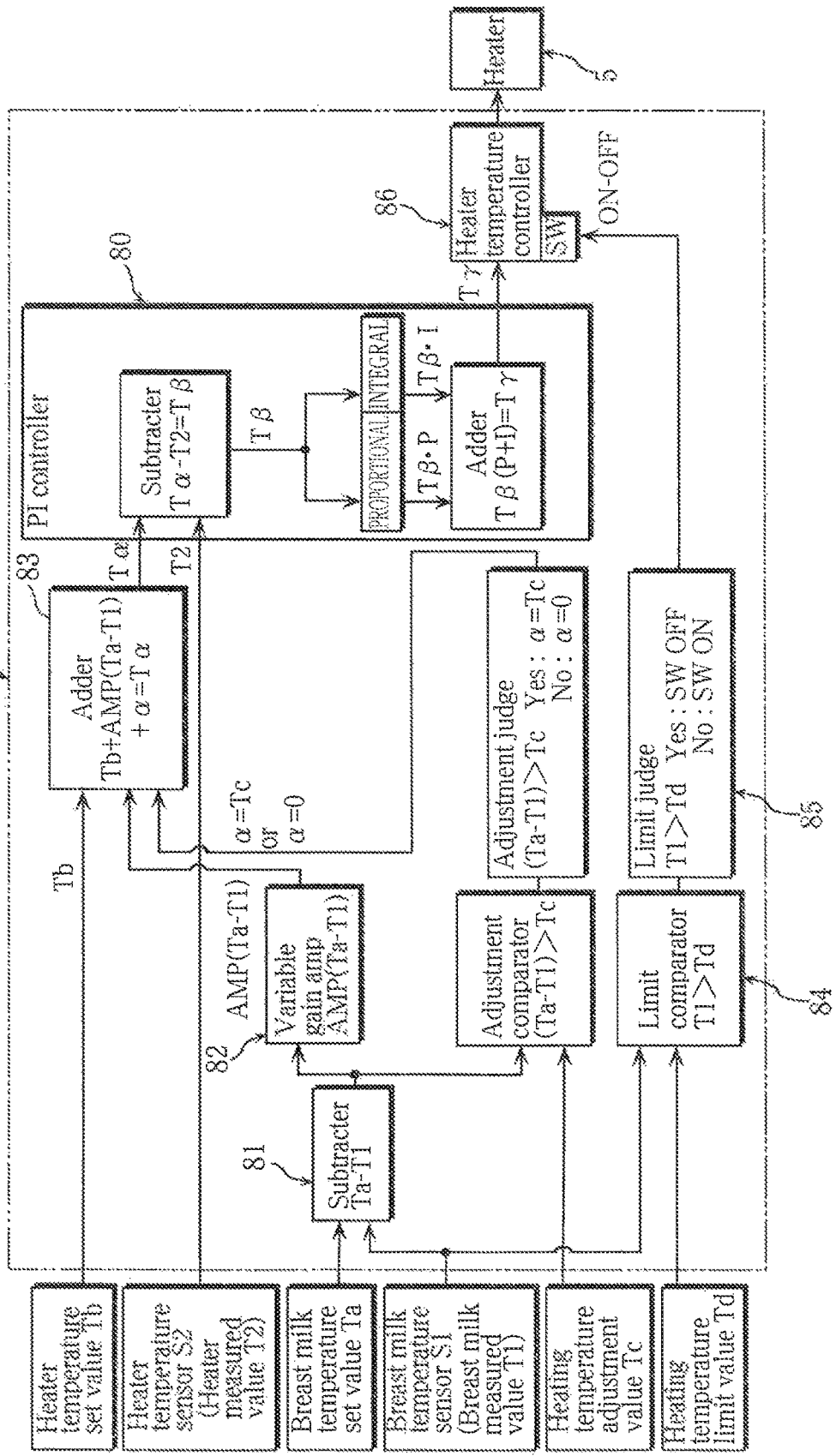
FIG. 7 is a block diagram showing an example of a breast milk temperature controlling portion.
Figure 8:
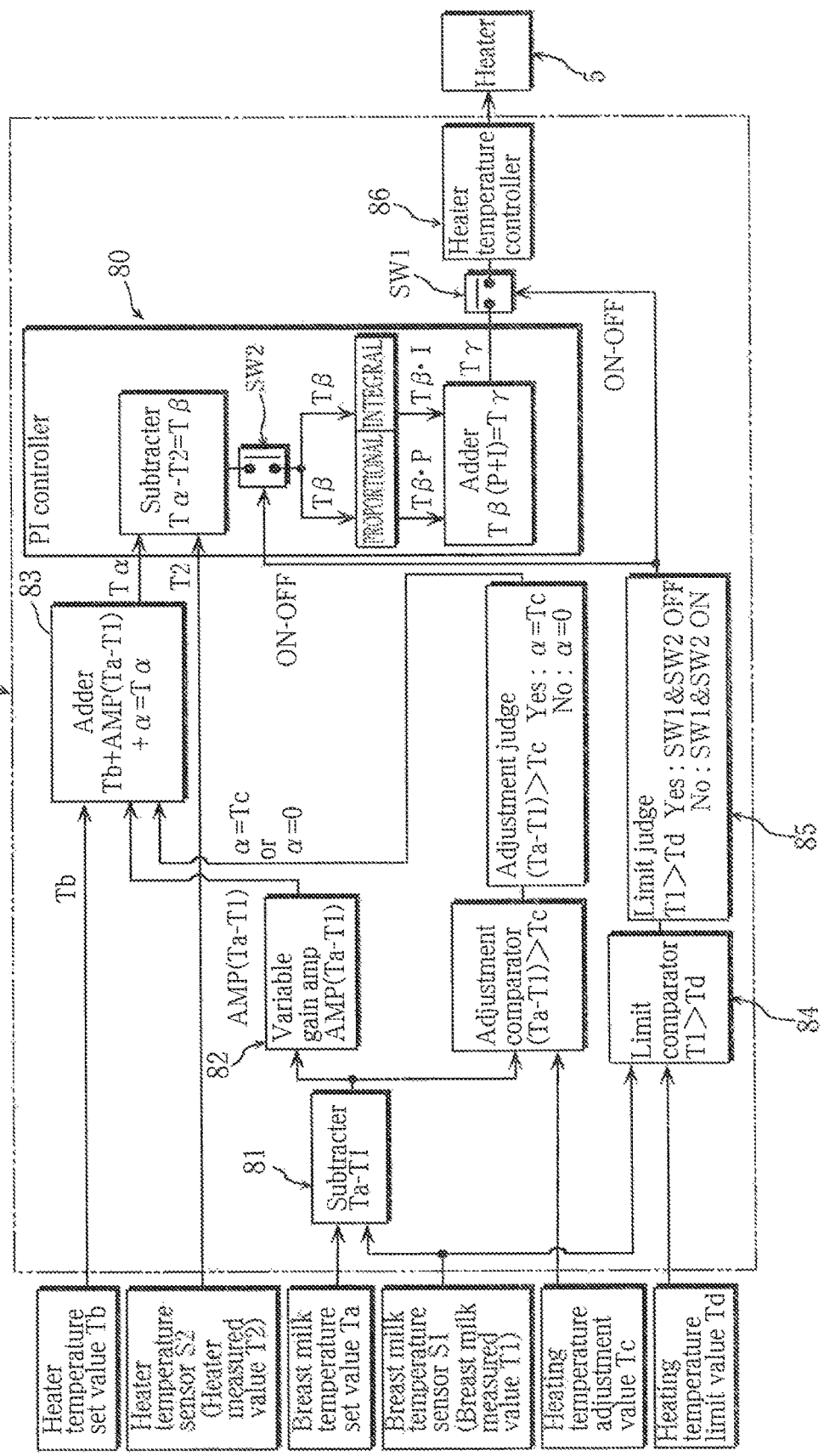
FIG. 8 is a block diagram showing an example of a breast milk temperature controlling portion.

And, another example of the breast milk temperature controlling portion 8 shown in FIG. 8 is different from the example in FIG. 7 in that 2 switches SW, a first switch SW1 and a second switch SW2, worked by the judged result signal (ON-OFF signal) of the limit judge 85, are provided. The other constructions are similar.

Concretely, the first switch SW1 is disposed between the PI controller 80 and the heater temperature controller 86.

The second switch SW2 is disposed between a subtractor to obtain the difference between the input values and a proportional processing portion and an integral processing portion in the PI controller 80.

With this construction, the control is made without unnecessary windup phenomenon.

That, is to say, without the second switch SW2, when a feedback loop is cut by the first switch SW1, integral component I accumulates errors while the first switch SW1 is cut (switched off). When the first switch SW1 is switched on again, known as windup phenomenon, the accumulated integral component I makes controlling state directed to unnecessary heating of the heater 5 just after the switching on.

As described above, windup phenomenon is not generated by the construction in which the first switch SW1 and the second switch SW2 are simultaneously controlled without unnecessary heating of the heater 5.

The breast milk temperature controlling portion 8, not restricted to the combination of the adders and the subtractors, may be a combination of multipliers, micro computers, and the PI controller 80, or computer control provided with a CPU, RAM, and ROM. And, the first and second switches SW1 and SW2 can be composed of dry switches or electronic switches.

Next, method of use (function) of the embodiment of the breast milk sterilizing apparatus of the present invention is described.

As shown in FIG. 2, intrusion of dust and germs in air is prevented by the lid body 3 to lid the nursing bottle 1 holding breast milk. Then, the nursing bottle 1 with the lid body 3 is inserted to the holder cylinder body 2, and the corner portion 15a of the outer wall portion 15 polygonal in cross section is press-fit to the cylindrical wall portion 21 of the holder cylinder body 2. That is to say, the ridge line portions 15e of the outer wall portion 15 are press-fit to the cylindrical wall portion 21 of the holder cylinder body 2 with straight lines in vertical direction in side view.

When heating sterilization of breast milk starts, the heater 5 heats the holder cylinder portion 2. The press fitting to the outer wall portion 15 of the nursing bottle 1 is kept even with heat inflation of the holder cylinder body 2, and the heat of the heater 5 is certainly transferred to the breast milk through the holder cylinder portion 2 and the nursing bottle 1. The heat is transferred from the corner portions 15a (the ridge line portions 15e) to the axis of the nursing bottle 1 as to concentrate, and the temperature of the breast milk in the nursing bottle 1 is heated (changed) almost uniformly without unevenness.

And, when heating sterilization of breast milk starts, the breast milk temperature controlling portion 8 reads the breast milk temperature measured value T1 measured by the breast milk temperature sensor S1 and the heater temperature measured value T2 measured by the heater temperature sensor S2, conducts feedback process (calculation) for the PI control of the heater 5 to increase the temperature of the breast milk as the solid line in FIG. 6 (the embodiment).

That is to say, the breast milk temperature controlling portion 8 controls the heater 5 as that the increasing speed of the temperature of the breast milk is reduced as the temperature of the breast milk comes close to the upper limit value Tz of sterilization temperature, and the temperature of the breast milk does not exceed the upper limit value Tz of sterilization temperature. And, from the starting point of sterilization, the point of time when the temperature of the breast milk goes over the lower limit value Ty of sterilization temperature, the breast milk is kept within a range from the lower limit value Ty to the predetermined upper limit value Tz for the predetermined sterilization processing time M2.

Further, the preliminary heating time M1, from the beginning of the heating to the lower limit value Ty of sterilization temperature is equal to or more than half of the sterilization processing time M2 and equal to or less than the sterilization processing time M2, and the heating sterilization time (controlling time of the heater 5) is ended utmost twice the sterilization processing time M2 (60 minutes).

A comparison example of sterilization by hot water bathing is shown with a two-dot broken line in FIG. 6. In sterilization by hot water bathing, it takes time to heat the water, and time difference (time lag) generated until the temperature of the breast milk reflects temperature control of the hot water. Therefore, in the comparison example, a preliminary heating time Ma until the lower limit value Ty is long, and the breast milk also exceeds the upper limit value Tz after going over the lower limit value Ty. Then, although attempted to make the temperature under the upper limit value Tz, the temperature is made even under the lower limit value Ty. And, when the temperature is increased again, the temperature exceeds the upper limit value Tz again. It is difficult, to keep subtle temperature within a range of 0.5° C. with repeating this wave (concavo-convex). Therefore, even after the predetermined sterilization processing time M2 from the starting point (of sterilization) when the temperature goes over the lower limit value Ty, the temperature of the breast milk may be less than the lower limit value Ty. That is to say, the time during which the temperature of the breast milk is equal to or more than the lower limit value Ty is shorter than the sterilization processing time M2.

When the breast milk is not kept over the lower limit value Ty of sterilization temperature for the predetermined sterilization processing time M2, cytomegalovirus (CMV), HIV virus, and germs may not be sterilized. And, when the temperature of the breast milk is over the upper limit value Tz of sterilization temperature, deterioration of proteins (denaturation of immunoglobulin) and loss of vitamin are caused. Therefore, nutrition and effective components of the breast milk are destructed.

That is to say, the present invention keeps the breast milk within the predetermined sterilization temperature (from the lower limit value Ty to the upper limit value Tz of sterilization temperature) for the predetermined sterilization processing time M2 to sterilize while nutrition and effective components of the breast milk are kept.

And, the heater 5 corresponds to each of the plural nursing bottles 1, the temperature of the breast milk in each of the nursing bottles 1 can be accurately controlled without ununiformity (in comparison with the case that plural nursing bottles 1 are dipped into one hot water tank to be heated as in sterilization by hot water bathing).

And, reliability is high (in comparison with the case that one of the plural nursing bottles 1 is measured for monitoring as in sterilization by hot water bathing) because temperature of each of the plural nursing bottles 1 is measured.

In the present invention, being modifiable, although 4 holder cylinder bodies 2 are held by the case body 9 in figures, they may be increased or decreased. And, the outer wall portion 15 of the nursing bottle 1 may be a square cylinder, an octagonal cylinder, or a dodecagonal cylinder (square, octagonal, or dodecagonal in cross section). And, although the bottom face 18 of the nursing bottle 1 is supported by the detecting portion 90 of the breast milk temperature sensor S1 and a non-detecting portion (base portion of the sensor), the bottom face 18 may be supported by a supporting member of resin or metal (contact member), or a diminished staged portion and an inner brim portion formed on the holder cylinder body 2.

As described above, it is unnecessary to directly dip the thermometer into the breast milk, sterilization can be conducted with hygiene, and washing and sterilization of the thermometer can be omitted because the breast milk sterilizing apparatus of the present invention is provided with the nursing bottle 1 holding breast milk, the holder cylinder body 2 of metal having the cylindrical wall portion 21 to which the nursing bottle 1 is inserted, the heater 5 and the heater temperature sensor S2 wound around a periphery of the cylindrical wall portion 21, the breast milk temperature sensor S1 to measure breast milk temperature on the bottom face 18 of the nursing bottle, and the breast milk temperature controlling portion 8 to control the heater 5 based on the breast milk temperature measured value T1 measured by the breast milk temperature sensor S1. The temperature of the heater is controlled by the breast milk temperature measured value T1 from the breast milk temperature sensor S1 to sterilize easily and certainly without bad influence on effective components and nutrition of the breast milk. For example, premature baby of around 6 months can drink mother's milk, mother's and another mother's milk, and another mother's milk with safety.

And, the temperature of breast milk can be measured with further accuracy, the heater 5 can be worked with good efficiency, and the breast milk can be sterilized without bad influence on effective components because the nursing bottle 1 has the concave portion 19 to which the detecting portion 90 of the breast milk temperature sensor S1 is inserted from the bottom face 18 side.

And, the nursing bottle 1 can be easily inserted to the holder cylinder body 2, and the nursing bottle 1 can always be made contact the cylindrical wall portion 21 to improve heat transfer efficiency and reduce the preliminary heating time M1 because the nursing bottle 1 has the outer wall portion 15 polygonal in cross section to be inserted to the cylindrical wall portion 21, and the corner portion 15a of the outer wall portion 15 polygonal in cross section is press-fit to the cylindrical wall portion 21. And, the holder cylinder body 2 and the nursing bottle 1, not necessary to be formed with high dimensional accuracy, can be easily made. The breast milk in the nursing bottle 1 can be uniformly and swiftly heated.

And, the sterilization can be conducted keeping (without destruction and reduction of) nutrition and effective components of the breast milk (components to improve immunity) because the breast milk temperature controlling portion 8 reads the breast milk temperature measured value T1 measured by the breast milk temperature sensor S1 and the heater temperature measured value T2 measured by the heater temperature sensor S2 to control the heater 5 as to keep the breast milk temperature in the nursing bottle 1 from the predetermined lower limit value Ty of sterilization temperature to the upper limit value Tz of sterilization temperature for the predetermined sterilization processing time M2, and as to reduce temperature increasing speed when the breast milk temperature comes close to the upper limit value Tz of sterilization temperature as not to exceed the upper limit value Tz when the breast milk is heated before being kept for the predetermined sterilization processing time M2. The preliminary heating time M1 is short for energy saving and excellent efficiency.

While preferred embodiments of the present invention have been described in this specification, it is to be understood that the invention, is illustrative and not restrictive, because various changes are possible within the spirit and indispensable features.

What is claimed is:

1. A breast milk sterilizing apparatus, comprising:
a nursing bottle holding breast milk;
a holder cylinder body of metal having a cylindrical wall portion to which the nursing bottle is inserted;
a heater and a heater temperature sensor wound around a periphery of the cylindrical wall portion;
a breast milk temperature sensor to measure breast milk temperature on a bottom face of the nursing bottle; and
a breast milk temperature controlling portion, operably coupled to the heater and the heater temperature sensor and to the breast milk temperature sensor, to control the heater based on a breast milk temperature measured value measured by the breast milk temperature sensor,
wherein the nursing bottle has an outer wall portion polygonal in cross section to be inserted to the cylindrical wall portion, and a corner portion of the outer wall portion polygonal in cross section is press-fit to the cylindrical wall portion, and
wherein the breast milk temperature controlling portion reads the breast milk temperature measured value measured by the breast milk temperature sensor and a heater temperature measured value measured by the heater temperature sensor to control the heater as to keep the breast milk temperature in the nursing bottle from a predetermined lower limit value of sterilization temperature to an upper limit value of sterilization temperature for a predetermined sterilization processing time, and as to reduce temperature increasing speed when the breast milk temperature comes close to the upper limit value of sterilization temperature as not to exceed the upper limit value when the breast milk is heated before being kept for the predetermined sterilization processing time.

2. The breast milk sterilizing apparatus as set forth in claim 1, wherein the nursing bottle has a concave portion to which a detecting portion of the breast milk temperature sensor is inserted from the bottom face side.

* * * * *